US006425416B1

(12) United States Patent
Narita et al.

(10) Patent No.: US 6,425,416 B1
(45) Date of Patent: Jul. 30, 2002

(54) FLUID DIRECTIONAL CONTROL DEVICE FOR SOLENOID VALVE ASSEMBLY

(75) Inventors: Masaru Narita; Bunya Hayashi; Makoto Ishikawa, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 13 days.

(21) Appl. No.: 09/669,595

(22) Filed: Sep. 26, 2000

(30) Foreign Application Priority Data

Oct. 18, 1999 (JP) .......................................... 11-295971

(51) Int. Cl.[7] ................................................ F16L 37/00
(52) U.S. Cl. .................... 137/625.27; 137/884; 285/12; 285/26
(58) Field of Search ........................ 137/625.27, 627.5, 137/884; 251/251; 285/12, 26, 906

(56) References Cited

U.S. PATENT DOCUMENTS

| 3,240,231 A | * | 3/1966 | Cadiou | 137/625.67 |
| 5,149,053 A | * | 9/1992 | Galli | 251/149.9 |
| 5,236,017 A | * | 8/1993 | Meyer et al. | 137/625.66 |
| 5,459,953 A | * | 10/1995 | Fukano et al. | 137/625.64 |
| 5,497,806 A | * | 3/1996 | Swank et al. | 137/625.65 X |
| 5,520,144 A | * | 5/1996 | Philo et al. | 123/90.5 |
| 5,586,570 A | * | 12/1996 | Fukano et al. | 137/271 |
| 5,682,918 A | * | 11/1997 | Stoll et al. | 137/85 |
| 5,762,094 A | * | 6/1998 | Hendershot et al. | 137/204 |
| 5,944,056 A | * | 8/1999 | Miyazoe et al. | 137/625.64 |
| 6,076,491 A | * | 6/2000 | Allen | 123/90.16 |
| 6,237,634 B1 | * | 5/2001 | Narita et al. | 137/625.27 |

FOREIGN PATENT DOCUMENTS

| DE | 1396 | * | 9/1938 | 137/627.5 |
| DE | 2023814 | * | 9/1971 | 137/627.5 |
| DE | 8103396 | * | 7/1981 | 137/627.5 |
| GB | 338341 | * | 11/1930 | 137/627.5 |
| GB | 1110945 | * | 4/1968 | 137/627.5 |

* cited by examiner

*Primary Examiner*—Michael Powell Buiz
*Assistant Examiner*—Meredith H. Schoenfeld
(74) *Attorney, Agent, or Firm*—Oblon, Spivak, McClelland, Maier & Neustadt, P.C.

(57) ABSTRACT

A directional control apparatus for a solenoid valve assembly, including a solenoid valve assembly including a supply/exhaust device and solenoid valves connected together, and a manual directional control valve. The supply/exhaust device is configured to supply to and exhaust from the solenoid valve assembly pressure fluids, and includes a supply-side connection port for connecting to a fluid supply tube and an exhaust-side connection port for connecting to a fluid exhaust tube. The manual directional control valve is configured to be connected between the supply/exhaust device and the fluid supply and exhaust tubes. The manual directional control valve has a supply channel for communicating the supply-side connection port and the fluid supply tube and an exhaust channel for communicating the exhaust-side connection port and the fluid exhaust tube. The manual directional control valve is configured to manually divert the pressure fluids between the supply and exhaust channels.

12 Claims, 3 Drawing Sheets

FLUID DIRECTIONAL CONTROL DEVICE FOR SOLENOID VALVE ASSEMBLY

TECHNICAL FIELD

The present invention relates to a fluid directional control device for a solenoid valve assembly, which is mounted on the solenoid valve assembly in which a plurality of solenoid valves for diverting pressure fluids are placed side by side and connected together in a width direction thereof for supplying and exhausting the pressure fluids to/from the assembly together.

BACKGROUND ART

A solenoid valve assembly in which a plurality of solenoid valves are placed side by side and connected together, and in which pressure fluids are supplied to or exhausted from the solenoid valves together in order to centrally control a plurality of actuators is well known. In general, a supply/exhaust block for supplying and exhausting the pressure fluids together to/from the solenoid valves is mounted on the solenoid valve assembly, pipe joints are each mounted on a supply port and an exhaust port of the supply/exhaust block, and a fluid supply tube or a fluid exhaust tube is connected to each of the pipe joints.

In this type of solenoid valve assembly, when checking the operation for maintenance or alignment of an actuator connected to the solenoid valve assembly, it is desirable that pressure fluids such as compressed air are manually supplied to or exhausted from the solenoid valve assembly while confirming the safety in order to determine whether the operation is proper.

On the other hand, although a switching valve or a directional control valve is generally provided in any part of a piping connected to the supply/exhaust block so as to divert the pressure fluids, it is not for use for the operation check as described above and has not a structure appropriate for the above usage.

Thus, easy-to-handle means for diverting fluids, in which the control for checking the operation is easy to perform and also which can be easily mounted on or removed from a predetermined location when necessary.

DISCLOSURE OF THE INVENTION

It is a technical object of the present invention to provide an easy-to-handle fluid directional control device for a solenoid valve assembly, which satisfies the above conditions, in which checking the operation is easy to perform, and also which can be easily mounted on or removed from a predetermined location when necessary.

In order to achieve the above object, according to the present invention, there is provided a fluid directional control device for a solenoid valve assembly, which is assembled in the solenoid valve assembly in which a plurality of solenoid valves are connected together, and having a supply/exhaust block which supplies and exhausts pressure fluids together to/from the solenoid valves, and a manual directional control valve detachably mounted on the supply/exhaust block for manually diverting the pressure fluids.

The supply/exhaust block has a supply-side connection port and an exhaust-side connection port arranged side by side in the vicinity, a fixing bracket inserting groove cut in the right and left side portions of the connection port train in a manner so as to cross part thereof in a perpendicularly crossing direction with respect to axes of the connection ports, and a generally U-shaped fixing bracket inserted in the fixing bracket inserting groove.

In addition, the manual directional control valve has: a cylinder-shaped supply-side connecting section and a cylinder-shaped exhaust-side connecting section each inserted in the connection port; locking grooves each formed on an outer periphery of each connecting section and in which the fixing bracket is locked; a supply port and an exhaust port communicated with each connecting section via a valve mechanism; two pipe joints detachably mounted on each port by being inserted; a fixing bracket inserting groove cut in the right and left side portions of the port train in a manner so as to cross part thereof in a perpendicularly crossing direction with respect to axes of the ports; and a generally U-shaped fixing bracket inserted in the fixing bracket inserting groove.

Furthermore, each of the pipe joints has on a periphery thereof a locking groove in which the fixing bracket mounted on the directional control valve is locked.

The present invention is constructed in such a way that a connection structure for connecting each connecting section of the directional control valve to each connection port of the supply/exhaust block and a connection structure for connecting the pipe joints to each port of the directional control valve are the same, and the pipe joints can be each mounted on the connection port of the supply/exhaust block in place of the directional control valve.

The fluid directional control device having the above construction is used by being mounted on the solenoid valve assembly. When used normally for centrally controlling an actuator by the solenoid valve assembly, the manual directional control valve is removed from the supply-side connection port and the exhaust-side connection port of the supply/exhaust block, alternatively, the pipe joints are each mounted on the connection ports, and a pressure-fluid supply tube and a pressure-fluid exhaust tube are connected to the pipe joints, respectively.

On the other hand, when testing for checking the operation of the solenoid valve assembly, the pipe joints are removed from the supply-side connection port and the exhaust-side connection port of the supply/exhaust block, while the manual directional control valve is mounted on the connection ports, and the pipe joints are connected to the supply port and the exhaust port of the directional control valve so that the pressure fluids are supplied to the supply/exhaust block via the directional control valve.

While supplying or exhausting the pressure fluids together to/from each solenoid valve of the solenoid valve assembly by manually operating the directional control valve, and while checking the operation of each solenoid valve by operation indicator lamps each provided for the solenoid valves, the overall operation of a fluid pressure device controlled by the solenoid valve assembly is checked. In the event of emergency etc., the pressure fluids can be exhausted together to secure the safe operation.

In the present invention, as described above, since the connection structure for connecting each connecting section of the directional control valve to each connection port of the supply/exhaust block and the connection structure for connecting the pipe joints to each port of the directional control valve are the same, and the pipe joints can be mounted on each connection port of the supply/exhaust block in place of the directional control valves, the directional control valve and the pipe joints can be easily and swiftly replaced when checking the operation is required.

According to an embodiment of the present invention, the directional control valve has: a supply channel for connecting the supply port and the supply-side connecting section together; an exhaust channel for connecting the exhaust port and the exhaust-side connecting section; a communicating path for communicating the channels with each other at an intermediate position; a supply valve seat provided on the way of the supply channel; a communicating valve seat provided between the supply channel and the communicating path; a valve member disposed between the supply valve seat and the communicating valve seat, which operates in a manner so as to close the communicating valve seat when opening the supply valve seat and to open the communicating valve seat when closing the supply valve seat; and a control lever for manually switching the valve member.

DETAILED DESCRIPTION OF THE INVENTION

Figure 1:
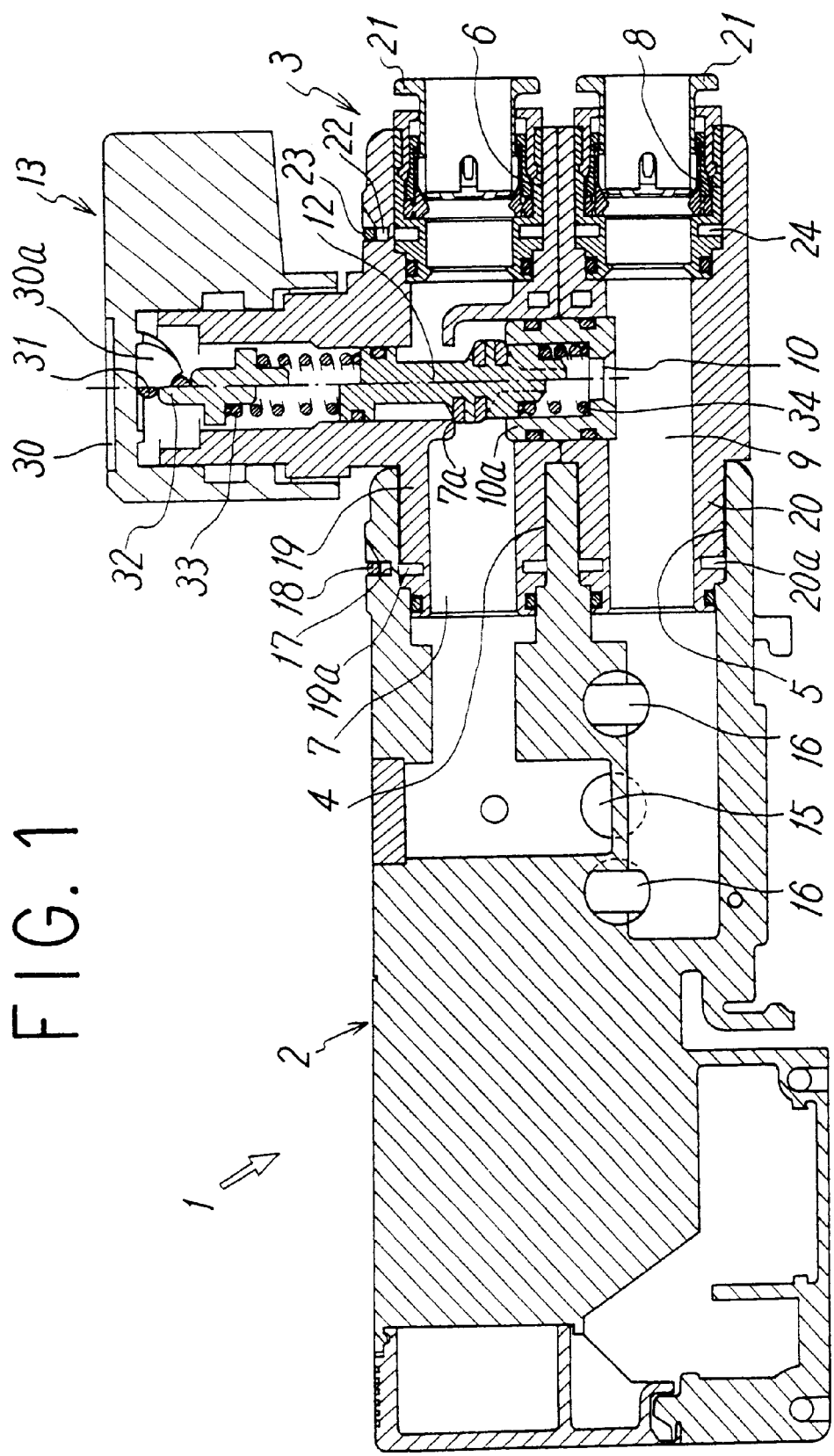
FIG. 1 is a cross-sectional view showing an embodiment of a fluid directional control device according to the present invention.
Figure 2:
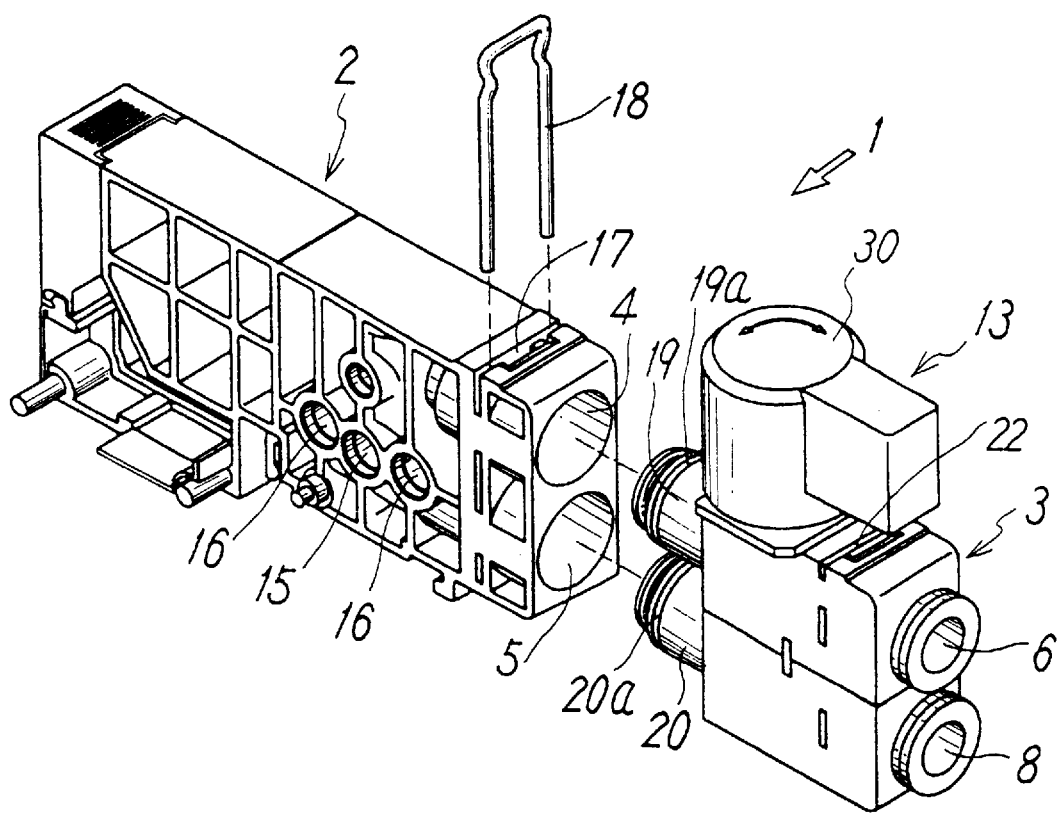
FIG. 2 is a perspective view showing a state in which a supply/exhaust block and a manual directional control valve are separated from each other.
Figure 3:
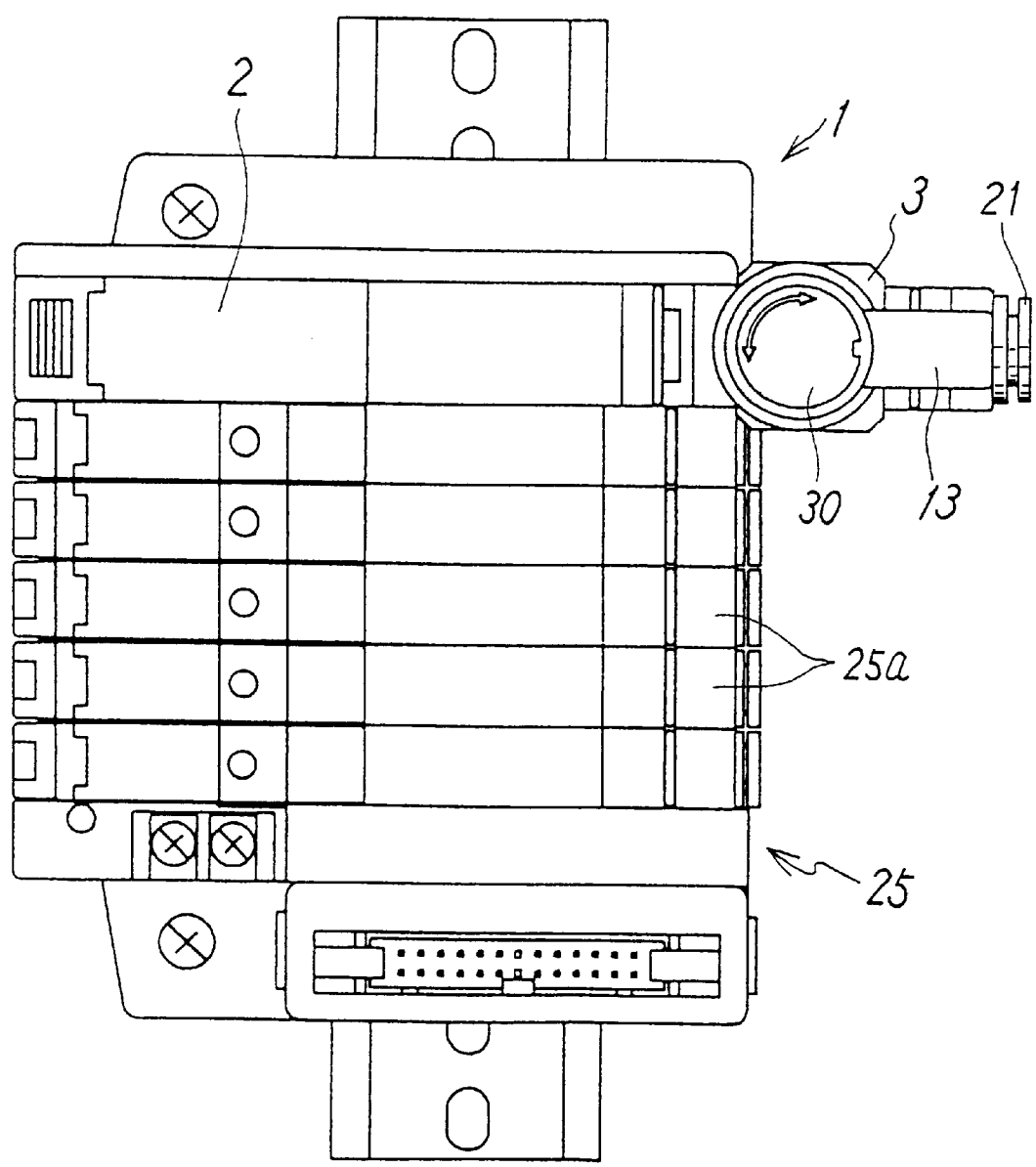
FIG. 3 is a plan view showing a using state thereof.

FIGS. 1 to 3 show an embodiment of a fluid directional control device for a solenoid valve assembly according to the present invention. The fluid directional control device 1 has a supply/exhaust block 2 to be assembled in a solenoid valve assembly 25 in which a plurality of solenoid valves 25a are arranged in a width direction thereof and connected together and a manual directional control valve 3 detachably mounted on the supply/exhaust block 2.

The supply/exhaust block 2 supplies and exhausts pressure fluids such as compressed air together to/from each solenoid valve 25a of the solenoid valve assembly 25, and has a supply passage 15 and a pair of exhaust passages 16 and 16, which are each connected to the solenoid valve assembly 25, a supply-side connection port 4 connected to the supply passage 15, and an exhaust-side connection port 5 connected to the pair of exhaust passages 16 and 16.

The two connection ports 4 and 5 are vertically arranged at two close positions on an end surface in a longitudinal direction of the supply/exhaust block 2. The supply/exhaust block 2 has a fixing bracket inserting groove 17 cut in right and left portions of a train of the connection ports 4 and 5 in a manner so as to cross part of the connection ports 4 and 5 in a perpendicularly crossing direction with respect to axes of the connection ports, and has a generally U-shaped fixing bracket 18 detachably inserted in the fixing bracket inserting groove 17.

On the other hand, the manual directional control valve 3 has on one end surface thereof a cylinder-shaped supply-side connecting section 19 and a cylinder-shaped exhaust-side connecting section 20 each inserted in the connection ports 4 and 5 of the supply/exhaust block 2, and has locking grooves 19a and 20a each formed on outer peripheries of the connecting sections 19 and 20. The fixing bracket 18 is fitted and locked in the locking grooves 19a and 20a so that the manual directional control valve 3 is mounted on the supply/exhaust block 2 in a manner so as not to come off therefrom.

On an opposite end surface of the manual directional control valve 3, there are provided a supply port 6 and an exhaust port 8 communicating with the connecting sections 19 and 20 through a supply channel 7 and an exhaust channel 9, and pipe joints 21 are detachably mounted on each of the ports 6 and 8. The pipe joints 21 are mounted on each of the ports 6 and 8 with the same method as that for mounting the manual directional control valve 3 to the supply/exhaust block 2. That is, the manual directional control valve 3 has a fixing bracket inserting groove 22 cut in the right and left side portions of a train of the ports 6 and 8 in a manner so as to cross part of the ports 6 and 8 in a perpendicularly crossing direction with respect to axes of the ports, and has a generally U-shaped fixing bracket 23 inserted in the fixing bracket inserting groove 22. Locking grooves 24 are each provided on outer peripheries of the pipe joints 21, and the fixing bracket 23 is fitted and locked in the locking grooves 24 so that the pipe joints 21 and 21 are mounted on the ports 6 and 8 in a manner so as not to come out therefrom. Thus, after completion of testing the operation of the solenoid valve assembly, the manual directional control valve 3 is removed from the supply/exhaust block 2, and also the pipe joints 21 and 21 are removed from the manual directional control valve 3, while mounting the pipe joints 21 and 21 to the connection ports 4 and 5 of the supply/exhaust block 2, thereby changing the supply/exhaust block 2 to an ordinary using state.

The manual directional control valve 3 includes: a communicating path 10 for communicating the supply channel 7 and the exhaust channel 9 with each other at an intermediate position thereof; a supply valve seat 7a provided on the way of the supply channel 7; a communicating valve seat 10a provided between the supply channel 7 and the communicating path 10; a valve member 12 disposed between the supply valve seat 7a and the communicating valve seat 10a; and a control mechanism 13 for manually switching the valve member 12. The control mechanism 13 includes: a first spring 33 provided on an upper end side of the valve member 12; a spring washer 32 attached on an upper end side of the first spring 33; a pin 31 disposed on an upper end portion of the spring washer 32; a control lever 30 having a cam surface 30a gradually pressing the pin 31 by swiveling; and a second spring 34 for recovering provided on another end side of the valve member 12.

When the control lever 30 is manually swiveled in one direction, the cam surface 30a gradually presses the pin 31 downward so that the spring washer 32 presses the first spring 33 and then the first spring 33 presses and moves the valve member 12 downward, as shown in the right half section of FIG. 1, with the result that the valve member 12 is seated at the communicating valve seat 10a and positioned at a first switching position for opening the supply valve seat 7a, thereby closing the communicating path 10. In this instance, the supply-side connection port 4 of the supply/exhaust block 2 and the supply port 6 of the directional control valve 3 are communicated with each other, and the exhaust side connection port 4 of the supply/exhaust block 2 and the exhaust port 8 of the directional control valve 3 are communicated with each other.

When the control lever 30 is swiveled in the reverse direction, the compression of the valve member 12 by the first spring 33 is released and the valve member 12 is pressed upward by the second spring 34 so that the valve member 12 opens the communicating valve seat 10a, while switching to the second switching position at which the supply valve seat 7a is closed. In this state, the supply-side connection port 4 of the supply/exhaust block 2 and the exhaust port 8 of the directional control valve 3 are communicated with each other and the supply port 6 of the directional control valve 3 is closed. In addition, the connection port 4 of the supply/exhaust block 2 and the exhaust port 8 of the directional control valve 3 are always communicated with each other.

The manual directional control valve 3 shows only an example, and any construction having the first switching position and the second switching position described above may be possible.

The fluid directional control device 1 having the above construction is used, as shown in FIG. 3, by being mounted on the solenoid valve assembly 25, in which the control lever of the manual directional control valve 3 is manually controlled to switch the valve member 12 to the first or second switching position so as to divert the pressure fluids supplied to the solenoid valve assembly 25.

In the fluid directional control device 1, the manual directional control valve 3 for manually diverting the pressure fluid 3 is mounted on the supply/exhaust block 2 for supplying or exhausting the pressure fluid 3 to/from the solenoid valve assembly 25 so that the overall operation of the fluid pressure device controlled by the solenoid valve assembly 25 can be checked, while being checked by operation indicator lamps etc. each provided for the solenoid valves 25a. In addition, when the solenoid valve assembly 25 comes in a dangerous state by an erroneous operation etc. of an actuator controlled thereby, the pressure fluids can be exhausted together so as to secure the safety during the operation.

In addition, since the connection structure for connecting each of the connecting sections 19 and 20 of the directional control valve 3 to the connection ports 4 and 5 of the supply/exhaust block 2 and the connection structure for connecting the pipe joints 21 to each of the ports 6 and 8 of the directional control valve 3 are the same, when it is required to check the operations of the solenoid valve assembly 25, the actuator connected thereto, etc. for maintenance, or when the device is returned to an ordinary using state after completion of the maintenance, operations such as mounting the directional control valve 3 on each of the connection ports 4 and 5 of the supply/exhaust block 2, or removing the directional control valve 3 and alternatively mounting the pipe joints 21 and 21 can be easily and swiftly performed, and also the construction of the device is simplified with the result that manufacturing and assembling of the device can be remarkably easily performed.

As mentioned above, in the fluid directional control device according to the present invention, while manually controlling the directional control valve to supply or exhaust the pressure fluids together to/from each solenoid valve of the solenoid valve assembly, and checking the operation of each solenoid valve with the operation indicator lamps etc. provided for each solenoid valve, the overall operation of the fluid pressure device controlled by the solenoid valve assembly can be checked, so that in the event of emergency etc., the pressure fluids can be exhausted together, thereby securing the safety of the operation.

Moreover, since the connection structure for connecting each connecting section of the directional control valve to each connection port of the supply/exhaust block 2 and the connection structure for connecting the pipe joints to each port of the directional control valve are the same, the operation of removing the pipe joints from the connection ports of the supply/exhaust block 2 and alternatively mounting the directional control valve, or mounting the pipe joints in place of the directional control valve can be easily and swiftly conducted, and also the construction of the device is simplified with the result that manufacturing and assembling of the device can be remarkably easily performed.

What is claimed is:

1. A directional control apparatus for a solenoid valve assembly, comprising:

a supply/exhaust device assembled in a solenoid valve assembly in which a plurality of solenoid valves are connected together, which supplies and exhausts pressure fluids together to/from the solenoid valves; and a manual directional control valve detachably mounted on the supply/exhaust device to manually divert the pressure fluids;

wherein said supply/exhaust device has:

a supply-side connection port and an exhaust-side connection port, which are placed side by side in the vicinity;

a fixing bracket inserting groove cut in right and left portions of the supply-side and exhaust-side connection ports in a manner so as to cross part of the supply-side and exhaust-side connection ports in a perpendicularly crossing direction with respect to axes of the supply-side and exhaust-side connection ports; and a generally U-shaped fixing bracket inserted in the fixing bracket inserting groove;

wherein said manual directional control valve has:

a cylinder-shaped supply-side connecting section and a cylinder-shaped exhaust-side connecting section, which are each inserted in said supply-side and exhaust-side connection ports;

locking grooves each formed on outer peripheries of the cylinder-shaped supply-side and exhaust-side connecting sections, in which said generally U-shaped fixing bracket is locked;

a supply port and an exhaust port communicating with each of said cylinder-shaped supply-side and exhaust-side connecting sections via a valve mechanism;

two pipe joints detachably mounted on each of the supply and exhaust ports by being inserted thereto;

a fixing bracket inserting groove cut in right and left side portions of said supply and exhaust ports in a manner so as to cross part of the supply and exhaust ports in a perpendicularly crossing direction with respect to axes of the supply and exhaust ports, and a generally U-shaped fixing bracket inserted in the fixing bracket inserting groove;

wherein said pipe joints each have in an outer periphery thereof a locking groove in which the generally U-shaped fixing bracket mounted on said directional control valve is locked; and wherein a connection structure for connecting said directional control valve to said supply/exhaust device and a connection structure for connecting said pipe joints to said directional control valve are the same, and said pipe joints is capable of being mounted on said supply/exhaust device in place of said directional control valve.

2. A directional control apparatus as in claim 1, wherein said directional control valve comprises:

a supply channel connecting said supply port to the supply-side connecting section;

an exhaust channel connecting said exhaust port to the exhaust-side connecting section;

a communicating path communicating the supply and exhaust channels with each other at an intermediate position;

a supply valve seat provided in said supply channel;

a communicating valve seat provided between said supply channel and the communicating path;

a valve member disposed between the supply valve seat and the communicating valve seat, which operates in a manner so as to close the communicating valve seat when the supply valve seat is opened, and to open the communicating valve seat when the supply valve seat is closed; and a control lever for manually switching the valve member.

3. A directional control apparatus for a solenoid valve assembly, comprising:

a solenoid valve assembly including a supply/exhaust device and a plurality of solenoid valves connected together, the supply/exhaust device being configured to supply to and exhaust from the solenoid valve assembly pressure fluids, and including a supply-side connection port for connecting to a fluid supply tube and an exhaust-side connection port for connecting to a fluid exhaust tube; and a manual directional control valve configured to be connected between the supply/exhaust device and the fluid supply and exhaust tubes, the manual directional control valve having a supply channel for communicating the supply-side connection port and the fluid supply tube and an exhaust channel for communicating the exhaust-side connection port and the fluid exhaust tube, the manual directional control valve being configured to manually divert the pressure fluids between the supply and exhaust channels.

4. A directional control device as in claim 3, wherein the supply-side connection port and exhaust-side connection port are configured to be connected to the supply and exhaust tubes via pipe joints, respectively.

5. A directional control device as in claim 4, further comprising a U-shaped fixing bracket; wherein:

the supply/exhaust device having a plurality of grooves configured to receive the U-shaped bracket; and the pipe joints each have in an outer periphery thereof a locking groove configured to coincide with a respective one of the plurality of grooves and receive the U-shaped bracket.

6. A directional control device as in claim 4, wherein:

the manual directional control valve has a supply-side connecting section and an exhaust-side connecting section; and the supply-side and exhaust-side connecting sections each have a structure substantially common to the joint pipes.

7. A directional control device as in claim 5, wherein:

the manual directional control valve has a supply-side connecting section and an exhaust-side connecting section; and the supply-side and exhaust-side connecting sections each have a structure substantially common to the joint pipes.

8. A directional control device as in claim 3, further comprising locking means for locking the manual directional control valve, the supply/exhaust device and the fluid supply and exhaust tubes.

9. A directional control device as in claim 5, wherein the manual directional control valve has a supply port for connecting to the supply tube via respective of the pipe joints, an exhaust port for connecting to the exhaust tube via respective of the pipe joints, a supply-side connecting section and an exhaust-side connecting section;

the supply and exhaust ports each have a structure substantially common to the supply-side and exhaust-side connection ports, respectively; and the supply-side and exhaust-side connecting sections each have a structure substantially common to the joint pipes.

10. A directional control apparatus as in claim 3, wherein the manual directional control valve comprises a communicating path communicating the supply and exhaust channels at an intermediate position, a supply valve seat provided in the supply channel, a communicating valve seat provided between the supply channel and the communicating path, a valve member positioned to close the communicating valve seat when the supply valve seat is opened and open the communicating valve seat when the supply valve seat is closed.

11. A directional control apparatus as in claim 10, further comprising a control lever for manually controlling the valve member.

12. A directional control apparatus for a solenoid valve assembly, comprising:

a solenoid valve assembly including an exhaust device and a plurality of solenoid valves connected together, the supply/exhaust device being configured to supply to and exhaust from the solenoid valve assembly pressure fluids, and including a supply-side connection port for connecting to a fluid supply tube and an exhaust-side connection port for connecting to a fluid exhaust tube; and manual directional controlling means for manually diverting the pressure fluids between a supply channel for communicating the supply-side connection port and the fluid supply tube and an exhaust channel for communicating the exhaust-side connection port and the fluid exhaust tube, the manual directional controlling means being capable of being connected and disconnected between the supply/exhaust device and the fluid supply and exhaust tubes.

* * * * *